W. P. ALLEN.
TRACTOR.
APPLICATION FILED JULY 22, 1911.
1,139,009.  Patented May 11, 1915.
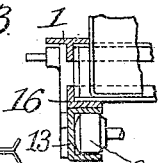
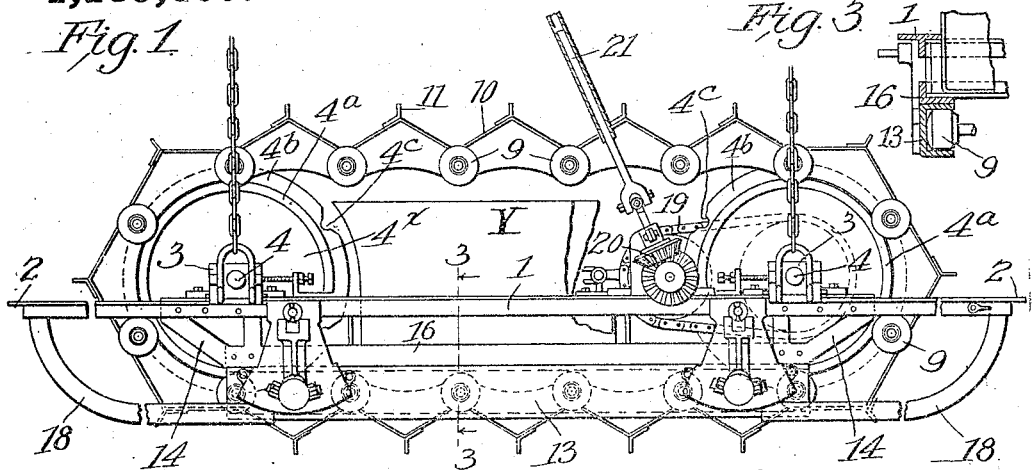
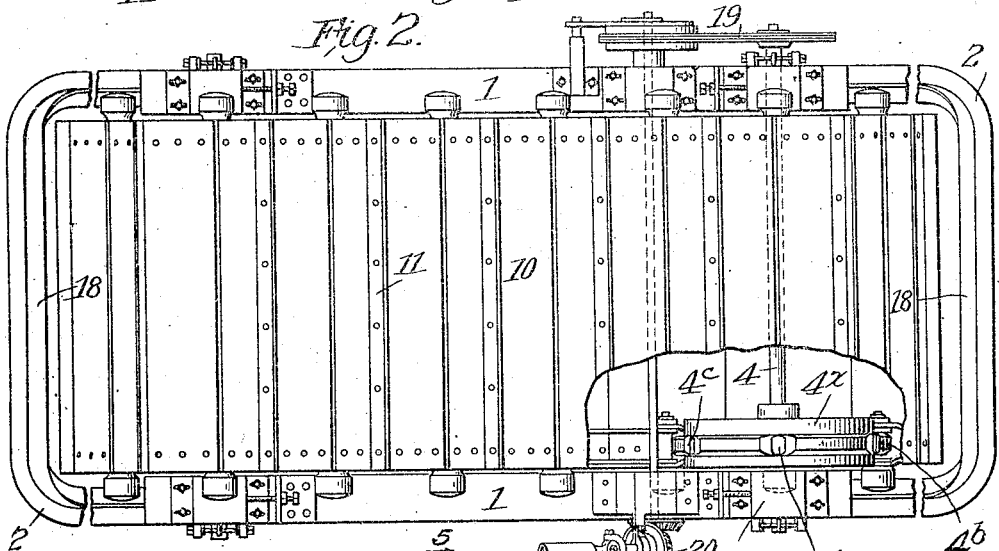
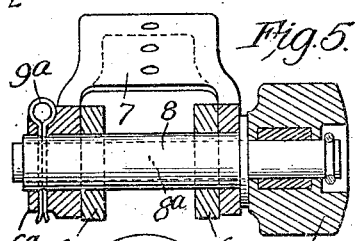
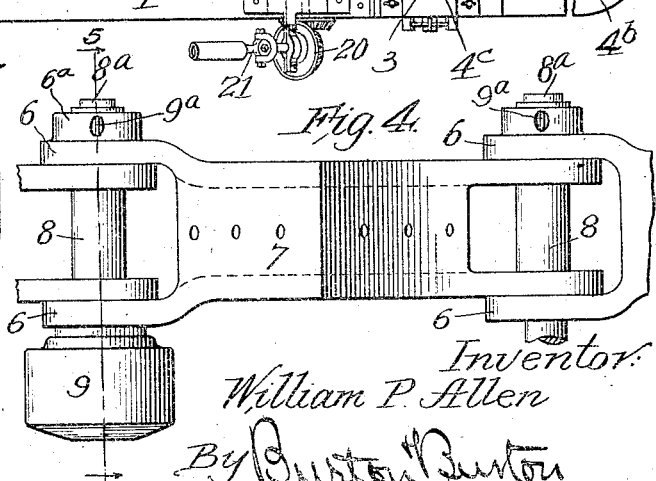
Inventor
William P. Allen

UNITED STATES PATENT OFFICE.

WILLIAM P. ALLEN, OF LITTLE ROCK, ARKANSAS, ASSIGNOR TO ALLEN TRACTOR COMPANY, A CORPORATION OF ILLINOIS.

TRACTOR.

1,139,009.  Specification of Letters Patent.  Patented May 11, 1915.

Original application filed January 31, 1910, Serial No. 541,087. Divided and this application filed July 22, 1911. Serial No. 639,956.

*To all whom it may concern:*

Be it known that I, WILLIAM P. ALLEN, a citizen of the United States, residing at Little Rock, in the county of Pulaski and State of Arkansas, have invented new and useful Improvements in Tractors, of which the following is a specification, reference being had to the accompanying drawings, forming a part thereof.

This application is a division of my application No. 541,087, filed January 31, 1910, and relates to an improved construction of a tractor.

It consists of the features and elements described and shown in the drawings as indicated in the claims.

In the drawings:—Figure 1 is a side elevation of the tractor mechanism embodying this invention. Fig. 2 is a top plan view of the same. Fig. 3 is a detail section taken as indicated at line 3—3 on Fig. 1. Fig. 4 is an enlarged detail plan view of a link of the tractor chain. Fig. 5 is a section taken as indicated at line 5—5 on Fig. 4. Fig. 6 is a side elevation of a roller shown in Figs. 1 and 5.

The tractor element of this structure, independently of the vehicle with which it would be connected, but which is not shown in the drawings herewith, will alone be described. It comprises the horizontal axle bearing frame consisting of two longitudinal beams, 1, 1, T-form in cross section, which are rigidly joined by front and rear yokes, 2, 2, which extend respectively forward and rearward around the tractor apron which is mounted between the longitudinal beams, 1. Upon said longitudinal beams are mounted axle boxes, 3, in which are journaled tractor axles, 4.

On each axle, near the bearings in the axle boxes, there are mounted rigidly two chain-engaging wheels, 4ˣ, the right-hand and left-hand wheels on the two axles being respectively alined fore-and-aft for connection by the tractor chains about to be described. The chain-engaging wheels each comprise a radial flange, 4ᵇ, and laterally projecting annular flanges, 4ᵃ, at opposite sides of the radial flange; said radial flange is provided with notches, 4ᶜ, for engaging the chain pintles, as hereinafter more particularly described.

The structure of the links of the tractor chain may be understood from Figs. 4 and 5. Each link comprises two parallel webs, 6, 6, connected by a transverse web, 7, forming a saddle adapted to stride the flange, 4ᵇ, of the chain-engaging wheel. The inner edges of the flanges, 6, are curved to conform to and seat on the annular flanges, 4ᵃ, of the wheel. At the outer side, the links are V-shaped preferably with a wide angle (as illustrated, 120 degrees), this being the form in section transverse to the axis of the wheel of the web, 7. The lateral webs or flanges, 6, of the link extend longitudinally beyond the web, 7, and at one end they are spread widely enough to admit between them the other end of the link, and the corresponding end of the next adjacent link is thus entered, and the two are connected together by a hollow pintle or sleeve, 8, taking through the four terminals thus assembled.

A bolt, 8ᵃ, extends through the hollow pintle and projects beyond the link at one side, being the outer side when it is mounted on the wheel, and on said projecting end carries an anti-friction roller, 9. The link has an annular boss, 6ᵃ, projecting around the pintle at the side opposite that at which the roller is mounted, and a cotter pin, 9ᵃ, inserted through this boss and through the pintle and the bolt, 8ᵃ, stops both said pintle and bolt against rotating in the link. The two wheels, 4ˣ, upon each axle are mounted thereon with their chain-engaging notches, 4ᶜ, alined transversely with the wheels,— that is, parallel with the axle,—so that the two chains have their respective links directly opposite each other throughout their entire extent around both wheels; and these opposite links are rigidly joined together by metal plates, 10, bolted on the outer sloping surfaces of the V-shaped webs, 7; and there is further applied to each pair of links thus joined an angle plate, 11, having one flange bolted on outside of one of the plates, 10, and its other flange projecting from the angle of the web or meeting line of the two plates in a plane substantially bisecting such angle. This mode of construction results in a tractor apron whose width is substantially the entire distance between the side bars of the frame and which has a ground engagement whose area is that width multiplied by the longitudinal distance from axle to axle; and such ground engagement is rendered most efficient for all varieties of track upon which the device may be operating by the ribs formed by the projecting flange of the angle plates, 11, which will engage comparatively hard soil sufficiently to prevent slipping, and by the wide angular alternating recesses and projections or V-shaped ribs and channels formed by the plates, 10, constituting the apron members, said angular form having the effect to compact the earth between the sloping faces and prevent it from being plowed by the device; that is, preventing the tracker apron from slipping so easily as it would if the earth were cut up into narrower sections by the engaging features of the apron or by the usual projecting ribs of the tractor wheel. In order, however, that the full valve of the extended area of engagement of the tractor with the earth may be available and operative for traction, it is necessary that the lower ply of the tractor apron between the wheels be prevented from bowing up, and shall, on the contrary, be held positively in straight line from tangent point to tangent point on the wheels, and it is for this purpose that the rollers, 9, are provided on the chain spindles. For coöperating with these rollers there is provided at each side a channel bar, 13, which is rigidly suspended by brackets, 14, from the longitudinal beam, 1, the channel being located in the path of the rollers, 9, from wheel to wheel; that is, so that the center of the channel is tangent to the path about the wheel of the axes of the chain pintles and rollers. The channels are wide enough to permit the rollers to travel freely in them, so that they are in contact with and roll on the upper flange when the weight is carried without jolting, and upon the lower flange in case of any rocking or jolting or dragging of the apron operating to produce distortion at any particular point.

Considering the structure thus described, it will be observed that the lower ply of the tracker apron engaged with the earth or roadway is fixed in position, and that the movement of travel which occurs is a movement of the frame and load carried by the tractor on the rollers, 9, with which the channel bars, 13, are engaged and to which the entire load is transmitted by such channel bars. The operation is therefore similar to that of moving a log on rollers mounted in fixed bearings in a chute or run-way, and the employment of the rollers insures the performance of the work with the minimum loss by friction in this travel. It will be further observed that the connection of the opposite links of the two tractor chains rigidly by the apron plates, 10, operates to prevent any tipping of the chains which would cause cramping of the rollers in their track along the channel bars, and also operates to prevent the turning of the rollers horizontally out of their true direct transverse position, and that this rigid connection, therefore, tends greatly to reduce the friction of travel. In view of the fact that the channel bars, as above stated, carry the entire load, they are reinforced by angle bars, 16, having the horizontal flange lodged upon the upper horizontal flanges of the channel bar and the vertical flange bolted to the brackets, 14. Further to reinforce the channel bars and hold them very rigidly in their proper position with respect to the frame, and especially to prevent their longitudinal displacement, and further as a means of facilitating the advance of the tractor over uneven ground, curved braces, 18, of sled runner form are rigidly bolted to the ends of the channel bars and extend longitudinally therefrom, being curved upwardly to the front and rear bows, 2, 2, respectively.

The drawings are designed to illustrate merely the tractor mechanism proper without indicating what sort of vehicle is to be carried thereby or what particular type of motive power is to be employed. Fig. 1, however, shows a driving chain, 19, for the wheel, $4^x$, and bevel gear connections. 20, from an oblique propeller shaft, 21, which would be operatively connected with an engine or motor mounted in the vehicle body above the tractor and not shown.

In Fig. 1 of the drawings there is shown in side elevation and partly broken away, a rectangular metal box, Y, which is of such exterior dimensions as to fit snugly within the frame between the two pairs of tractor wheels, $4^x$. This box is designed in addition to serving the purpose of horizontal bracing for the frame, to hold material with which it may be loaded for weighting the tractor in any case in which such additional weight may be desirable for increasing the traction.

I claim:—

1. A tractor belt comprising a series of traction blades extending transversely of the direction of travel at the road-engaging ply of the belt, and a corrugated supporting member comprising surfaces which slope upwardly from the opposite faces of each of said blades at said road-engaging ply.

2. A tractor belt composed of a series of pivotally-connected links, each of said links comprising a traction blade extending transversely of the direction of travel when in road-engaging position and in a plane intermediate the link pivots, and supporting surfaces which slope upwardly from the opposite faces of such blade when the link is in the lower and road-engaging ply of the belt.

3. In an endless belt tractor, a traction belt comprising a series of links angular in section transverse to the link pivots, the apex of the angle being in a plane transverse to the travel of the tractor belt and intermediate the axes of said link pivots, each of said links having a blade-like traction rib projecting from the apex of its angle.

4. In an endless belt tractor; a traction belt having a corrugated tractive surface, the outwardly-projecting corrugations being angular in vertical section parallel to the direction of travel, and the distances from the apexes of such successive corrugations being substantially greater than the depth of the space between them, and said projecting corrugations being each provided with a blade-like traction rib extending transversely of the direction of travel, arranged to project downwardly for engagement with the road surface.

5. A tractor comprising a frame and four carrying wheels therefor, two at each side; a tractor apron consisting of tractor chains traveling respectively about the wheels at opposite sides having their links angle-shaped in section transverse to the chain pivots, and plates connecting the opposite links of the two chains, secured for such connection to the oppositely inclined sides of the angle-shaped links.

6. A tractor comprising a frame, tractor-carrying wheels journaled on the frame; a tractor apron encompassing such wheels, such apron comprising chains positioned on their wheels with their links respectively opposite each other; webs or plates rigidly connecting the opposite links, such webs being angular or V-shaped in transverse section and having each a traction rib projecting from the angle.

7. In a tractor, in combination with a frame, carrying wheels journaled therein, and a tractor chain mounted about said wheels for travel thereon, the chain comprising a series of pivotally connected links, rollers mounted on the chain at the link pivots, a bar on the frame positioned above said rollers at the course of the lower ply of the chain and forming a track therefor, and a guard-rail positioned below the rollers opposite said track bar.

8. A tractor comprising a frame, tractor driving wheels journaled thereon, and the tractor apron encompassing said wheels, such apron consisting of two chains having their links respectively opposite each other, and webs or plates rigidly connecting the opposite links, rollers mounted on the chains at the link pivots, and tracks positioned above and below said rollers at the course of the lower ply of the chain.

9. A tractor consisting of tractor driving wheels; a tractor apron encompassing such wheels and comprising pivotally connected links; rollers mounted at the link pivots of such apron, and channel bars positioned to protrude their flanges above and below the rollers to serve as tracks for the same at the course of the lower ply of the apron.

In testimony whereof I have hereunto set my hand at Little Rock, Arkansas this 18 day of July, 1911.

WILLIAM P. ALLEN

Witnesses:
R. R. LYNN,
A. S. MACKENZIE.

Copies of this patent may be obtained for five cents each, by addressing the "Commissioner of Patents, Washington, D. C."